United States Patent [19]

Schnabel

[11] 4,318,212

[45] Mar. 9, 1982

[54] STAKING TOOL FOR INSTALLATION OF SPHERICAL BEARINGS AND BUSHINGS WITH RING-GROOVED FACES FOR RETENTION

[75] Inventor: Siegfried Schnabel, Bremen-Lesum, Fed. Rep. of Germany

[73] Assignee: Vereinigte Flugtechnische Werke-Fokker GmbH, Bremen, Fed. Rep. of Germany

[21] Appl. No.: 97,153

[22] Filed: Nov. 23, 1979

[30] Foreign Application Priority Data

Nov. 27, 1978 [DE] Fed. Rep. of Germany ....... 2851308

[51] Int. Cl.$^{3}$ .............................................. B23P 19/04

[52] U.S. Cl. ...................................... 29/252; 29/283.5

[58] Field of Search ................ 29/283.5, 252, 149.5 B, 29/441 R, 148.4 R, 148.4 A, 148.4 C

[56] References Cited

U.S. PATENT DOCUMENTS

| | | | |
|---|---|---|---|
| 3,068,552 | 12/1962 | Williams et al. | 29/149.5 B |
| 3,422,520 | 1/1969 | Bannister | 29/283.5 |
| 3,555,645 | 1/1971 | Kuhn | 29/441 X |
| 3,593,401 | 7/1971 | Chirco | 29/252 |
| 3,736,635 | 6/1973 | Romer et al. | 29/441 X |
| 4,214,357 | 7/1980 | Delves | 29/252 X |

*Primary Examiner*—Robert C. Watson

*Attorney, Agent, or Firm*—Smyth, Pavitt, Siegemund & Martella

[57] ABSTRACT

A portable tool is disclosed in which hydraulically a two-arm lever is operated to move a staking head towards the grooved outer race of a bearing, which is supported by a staking foot towards each other. Staking head and staking foot are mounted in the legs of a U-shaped tool attachment, being keyed into and releasably bolted to the holder for the hydraulic drive.

9 Claims, 3 Drawing Figures

STAKING TOOL FOR INSTALLATION OF SPHERICAL BEARINGS AND BUSHINGS WITH RING-GROOVED FACES FOR RETENTION

BACKGROUND OF THE INVENTION

The present invention relates to retain spherical bearings and bushings for bearings into bores, e.g., of fittings in aircraft, or other vehicles, by staking Bearings or Bushings with lips along an annular 'V'-shaped groove in their faces are, for example, inserted in bores in that the lips are forced against the chamfered entrances of the bores to positively position and retain the bearings or bushings by means of such a staking method. The working force is usually provided by means of a punch of a large press. In the case of an initial manufacturing process, such a press and related equipment is, or can be, readily made available. The situation is different if defective or worn bearings or bushings are to be replaced. This would or may necessitate also the removal of the part in which the bearings or bushings are inserted. This removal is particularly necessitated by the staking method since the required forces are in the order of several thousand deca-Newtons. It is apparent that such a removal of the part in which a new bearing or bushing is to be inserted is undesirable in general, and particularly so in aircraft.

DESCRIPTION OF THE INVENTION

It is an object of the present invention to provide a new and improved equipment or tool by means of which one can stake a bearing or bushing in a bore of a part without having to remove that part.

In accordance with the preferred embodiment of the invention, it is suggested to provide a portable, plier- or scissors-like holder or housing having a bed, or the like, for exchangeable tool-attachments, each (one at a time being used) holds a staking head and a staking foot. The housing further supports a hydraulic drive, having a piston which is operatively connected to the staking head by means of a two-arm lever being pivoted on the holder or housing. The staking head and staking foot engage the bearing or bushing from opposite axial ends.

This device, in accordance with the invention, is capable of producing a force up to sixteen thousand deca Newtons which suffices for staking many sizes of bearings or bushings. The tool-attachment should basically be comprised of U-shaped, profiled blocks, the legs of which have bores for slidingly receiving (snug-fit) and supporting the staking head and staking foot; the bottom element of the U has integrated parallel keys on opposite sides which are received in mating keyways in the holder for thrust support. Moreover, the cross-element of the attachment has in each instance a threaded bore to receive a threaded bolt, projecting from the holder. The integrated parallel keys and mating keyways releave the bolt from any working force.

The use of tool-attachments permits ready adaptation of the tool to different-sized bearings or bushings. The engagement between the hydraulic drive piston and the two-arm lever is to include a threaded bolt or adjusting screw in one arm of the lever to adjust the stroke length and to facilitate removal of the tool-attachment by enlarging the pivot range of the lever. Not only does the lever link the drive with the staking head, but the lever's arm lengths are selected so as to increase the effective force exerted by the staking elements upon the work.

The preferred embodiment of the invention, the objects and features of the invention, and further objects, features and advantages thereof, will be better understood from the following description taken in connection with the accompanying drawings.

Figure 1:
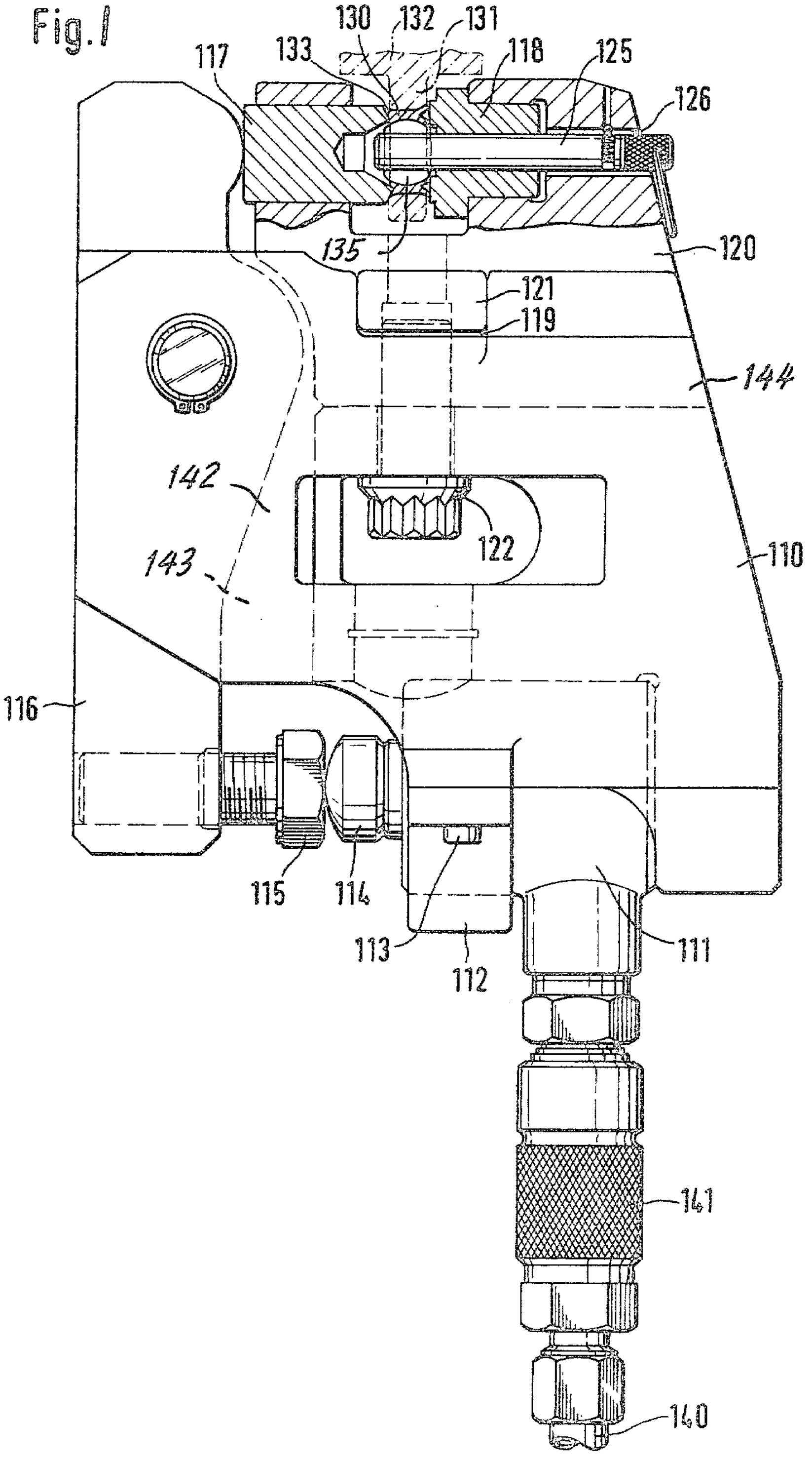
FIG. 1 is a side view of a tool constructed in accordance with the invention and constituting the best mode of constructing the preferred embodiment of the invention.
Figure 2:
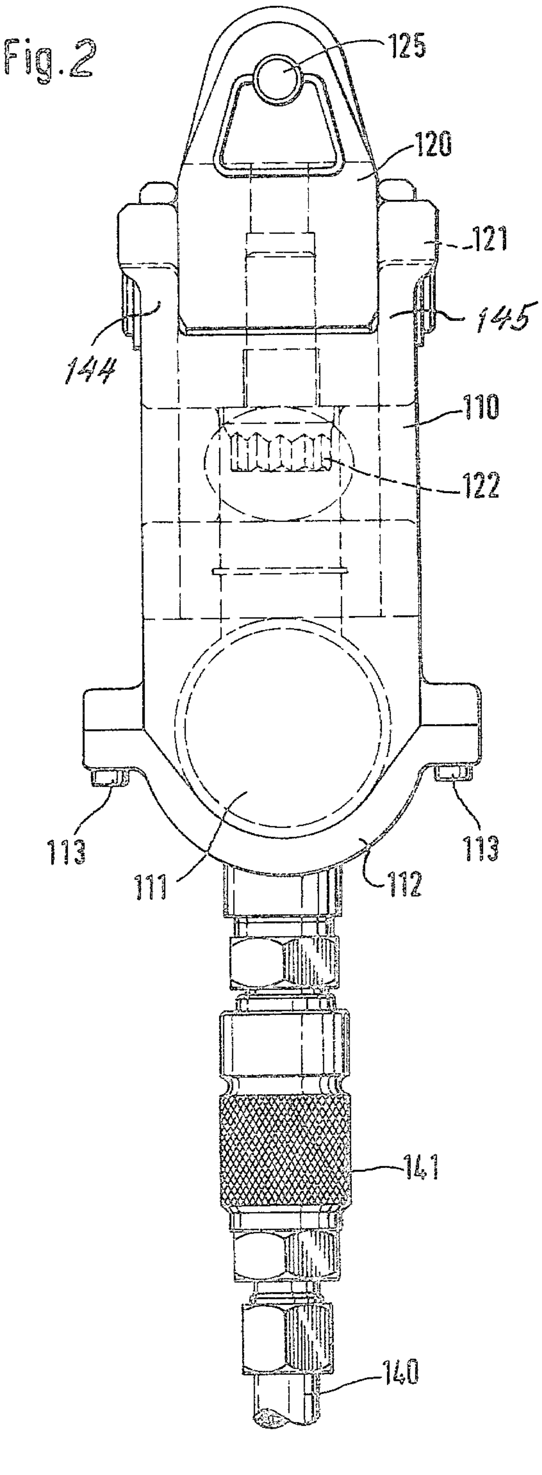
FIG. 2 is a front view of the tool shown in FIG. 1.

Proceeding now to the detailed description of the drawings, the figures show a housing 110, constituting the basic tool holder. A hydraulic cylinder 111 is secured to the lower portion of housing 110 by means of a clamp 112 and screws 113. A piston rod 114 projects from the cylinder and constitutes the movable part of the hydraulic drive, acting directly on an adjusting bolt 115.

A conduit 140 is connected to cylinder 111 by means of a quick release coupling 141. This permits rapid connection to and disconnection from a suitable source of hydraulic fluid such as a pump or the like. The quick-release coupling must be provided with sealing means to prevent air from entering the hydraulics. Air leakage into the system may interfere with the generation of a force sufficiently high to effect the desired staking. In addition, the seal also prevents leakage of oil from the hydraulic-system during coupling.

Cylinder 111 may include a spring for retracting the piston of piston rod 114 whenever pressurized fluid is not applied to the drive cylinder. Suitable sealing means are also provided here to prevent the inflow of air into a cylinder as such air may well reduce the effective force provided by the drive under specified and/or available hydraulic pressure conditions.

Bolt 115 is provided to determine and to adjust the effective stroke length of the drive and to eliminate backlash from all drive-elements, by providing positive connection, before and during the staking operation, so that the piston has no dead-way. Bolt 115 is threaded into and extends from one arm of a two-arm lever 116 which is pivoted in and between two extension walls 142 and 143 of housing 110. The other arm of lever 116 acts on staking head 117. The lever is constructed to provide a doubling of the force acting on the arm supporting bolt 115; this higher, i.e., increased force is effective on element 117. Additionally, bolt 115, when threaded all the way into the respective arm, permits lever 116 to be pivoted counterclockwise, so that the other arm of the lever can be pivoted out of the way of the tool attachment 120 and the staking head 117 on top of housing 110.

Staking element 117 is slidably mounted in a tubular bore and bed of tool-attachment 120. Tool attachment 120 is received in a bed of housing 110 established by upwardly extending side walls 144 and 145 thereof. The pivot for lever 116 is received in bores respectively located in the rearwardly extending side wall portions 142 and 143 which, respectively, merge with and continue the side wall 144 and 145. The wall-portions 142, 143, 144 and 145 are integral parts of housing 110.

The tool attachment 120, is of a configuration resembling, in the plane of FIG. 1, an upwardly extending U. One leg of that U has a tubular bore; the leg with the tubular bore has been referred to above as bed for staking element 117. The other leg of the U has a coaxial bore, being a blind bore in part and receiving staking element 118. Elements 117 and 118 are, thus, positioned to act in line. The bottom crossbar, or cross-element, of the U of tool-attachment 120 has two laterally extending parallel keys 121 which are received in keyways 119 in side walls 144 and 145 of housing 110. This construction establishes a thrust support for the staking operation.

In addition, tool-attachment 120 is provided with a threaded bore into which a bolt 122 can be threaded for releasably securing the tool-attachment to housing 110. The head of the bolt is accessible through windows in housing 110.

Tool-attachment 120 is constructed for accommodating a particular bearing or bushing. For this, a centering pin 125 is provided which traverses snugly staking foot 118 as well as clearingly the bore 126 in the above-mentioned other leg of the U-shaped tool-attachment 120. A ball under pressure of a spring holds the pin 125 in axial position. Pin 125 traverses ball 135, part of spherical bearing 130 to be staked, thereby centering the bearing or bushing to the staking elements.

The primary purpose of the tool as described is to stake bearings or bushings such as spherical bearing 130 into a part such as a fitting 132 while it is mounted on an aircraft. The tool can also be used for staking operations on parts not mounted on an aircraft, even if no stationary facilities are available. Spherical bearing 130 has two lips 133, on the outer race, one on each face. Both of them are separately staked, one staking operation for each lip. FIG. 1 shows specifically the equipment in a position and operational state in which the lip of the left-hand side of the bearing or bushing is being staked by operation of staking element 117. This element has a tapering, conical outer surface which performs the work. The inwardly tapering conical surface does not bear against the inner lip of the outer race of the bearing or bushing. The two (inner and outer) cones of staking elements 117 and 134 being truncated cones, merge by a transition radius to an annular apex.

In preparation for the staking operation, screw 115 is fully screwed into the lower lever arm so that staking head 117 can be retracted so far, that enough clearance is available between both staking elements, to bring the complete device into position for guiding, centering Pin 125 is inserted into ball 135. The centering Pin 125 holds the entire assembly in mandrel-like fashion. Screw 115 is then turned so that its head contacts the ball shaped piston rod end 114, so that no backlash occurs between any drive elements, staking elements 117 and 118 position for defining a particular stroke length, and the bearing or bushing 130. The upper arm of lever 116 causes the front ends of the staking elements to engage bearing or bushing 130. The staking foot 118 is used only for supporting bearings or bushings and fittings during the staking of the initial ring lip of bearing or bushing, (STAKING OPERATION I).

Staking foot counterpunch, 118, has a stepped, flat front end which bears against the (other) axial end of the outer race of the bearing or bushing. The step-dial is slightly smaller than the O.D. of bearing or bushing. Moreover, staking foot 118 bears against the particular eye portion 131 of fitting 132 adjacent to and surrounding the bore in which bearing or bushing 130 has been inserted, so that the step ensures that the bearing or bushing does not protrude from the fitting-face.

The staking operation is carried out by applying hydraulic, pressurized fluid to cylinder 111, causing lever 116 to be rotated in clockwise direction. The source for pressure can be existing equipment within the plant, or elsewhere; but one may also use a hand pump for on-site operation. A pressure gauge may be used and connected to the hydraulic system, being, for example, calibrated in units of force effective on staking head 117. It was found that the staking force should be sustained for about 15–20 seconds to ensure safe and lasting staking.

Figure 3:
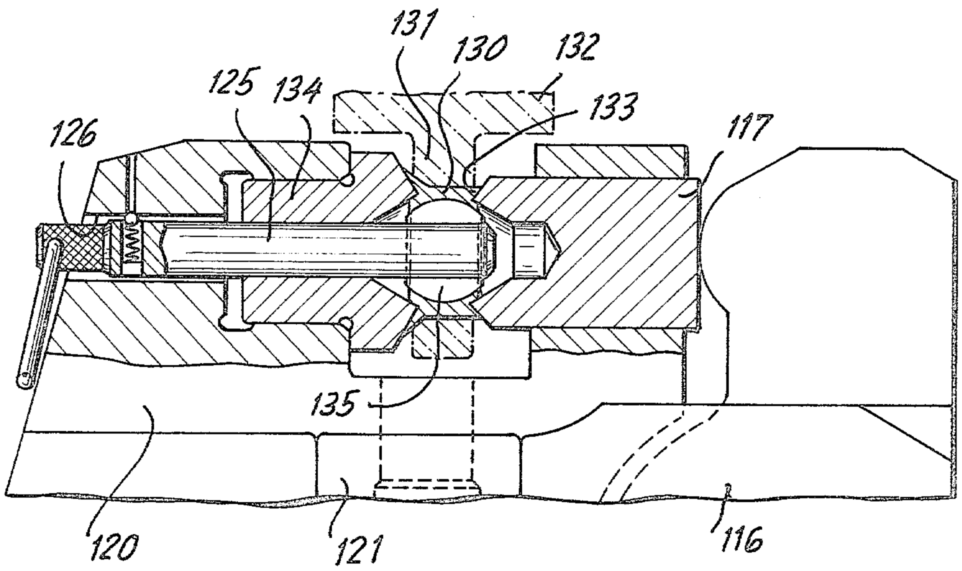
FIG. 3 is a section view of a portion of the tool as shown in FIG. 1, showing specifically another phase of the operation. (Staking of the second side of the bearing or bushing).

Next, centering pin 125 has to be removed from the device, there after staking foot 118 is replaced by a staking element 134 (FIG. 3) to stake the ring-lip on the other end of the bearing or bushing (STAKING OPERATION II). The replacement requires again that screw 115 to be fully screwed into its arm to free element 117 from engagement with lever 116 in a protracted position. The device is removed from the fitting and turned 160° to the longitudinal axis of the bearing or bushing, so that staking element 134 comes to bent against that part of the bearing or bushing, which was staked already in Staking Operation I. The staking element 117 is now used again as staking head, to stake the ring lip on the second end of the bearing or bushing. Element 134 always supports only the bearing or bushing and never contacts the fitting. Upon completing the replacement of element 118 by another (namely element 134), screw 115 is again advanced to the operating position. Elements 117 and 134 are quite similar as far as the double-conical work surfaces are concerned. The staking of the second lip is a repetition of the first staking operation.

A different type and size of bearing bushings may require different tooling. For this reason, insert 120 is replaceable as a whole. Upon releasing screw 122, insert 120 can be taken out from between walls 140 and 141 of housing 110. The adjusting screw 115 should likewise be adjusted to permit free counterclockwise pivoting of lever 116 for ease of removing insert 120. Moreover, a new one with different tool elements may require a different range of lever displacement. In either case, adjusting screw or bolt 115 establishes a positive connection between the piston drive and the lever in order to obtain a positive force transmission link between that drive and the respective punch.

One can readily see that the tool can be used to stake bearings or bushings into parts such as fittings which are accessible only with difficulty. It is merely necessary to permit the upper arm of lever 116 as well as the one leg of tool-attachment 120 holding staking head 117 to be placed behind fitting part 131.

The invention is not limited to the embodiments described above, but all changes and modifications thereof not constituting departures from the spirit and scope of the invention are intended to be included.

I claim:

1. A portable equipment and tool for staking spherical bearings or bushings into bores of parts such as fittings in aircraft, comprising:

a housing as a supporting device;

a two-arm lever pivoted on said housing, there being a short arm and a long arm;

a hydraulic drive on the housing, having a piston rod operatively connected to the long arm of the lever; and a tool attachment of U-shaped configuration, releasably secured to the housing and having two arms respectively slidingly supporting a staking head element and a staking foot element for engagement with opposite axial ends of the bearings and bushings, one of the elements being in operative connection with the short arm of the lever so that the staking head and staking foot elements are moved towards each other upon operation of the drive to obtain staking.

2. An equipment as in claim 1, wherein a bottom element of the U-shaped tool-attachment from which the legs extend, is provided with means for fastening and locating the tool-attachment to the housing.

3. An equipment as in claim 2, the means for fastening and locating including separate thrust support means and a threaded means for connecting the tool-attachment to the housing.

4. An equipment as in claim 3, the thrust support means being integrated parallel keys extending from the tool-attachment and being received by keyways in the housing.

5. An equipment as in claim 1, one of the elements as supported being traversed by a replaceable centering pin.

6. An equipment as in claim 1, said drive being spring-biased.

7. An equipment as in claim 1, including quick release means for a hydraulic connection to the drive.

8. An equipment as in claim 1, wherein at least one of the elements has a conical work surface.

9. An equipment as in claim 1, the work surface being an outer cone and an inner cone, merging with an annular apex.

* * * * *